United States Patent
Schönfeld et al.

(10) Patent No.: US 9,174,290 B2
(45) Date of Patent: Nov. 3, 2015

(54) MOTORIZED WORKING TOOL

(75) Inventors: Michael Schönfeld, Rohlstorf (DE); Manfred Döring, Neuhof (DE)

(73) Assignee: MAKITA CORPORATION, Anjo-Shi (JP)

(*) Notice: Subject to any disclaimer, the term of this patent is extended or adjusted under 35 U.S.C. 154(b) by 873 days.

(21) Appl. No.: 13/345,192

(22) Filed: Jan. 6, 2012

(65) Prior Publication Data
US 2012/0186843 A1    Jul. 26, 2012

(30) Foreign Application Priority Data
Jan. 26, 2011  (DE) .................... 20 2011 000 186 U

(51) Int. Cl.
*B23D 47/00* (2006.01)
*B25F 5/00* (2006.01)

(52) U.S. Cl.
CPC .............. *B23D 47/005* (2013.01); *B25F 5/006* (2013.01)

(58) Field of Classification Search
USPC .......................................................... 83/490
See application file for complete search history.

(56) References Cited

U.S. PATENT DOCUMENTS

| | | | |
|---|---|---|---|
| 5,013,355 A * | 5/1991 | Elvander et al. ................. | 75/707 |
| 5,016,355 A | 5/1991 | Gassen et al. | |
| 6,016,604 A * | 1/2000 | Wolf et al. ....................... | 30/383 |
| 6,446,421 B1 * | 9/2002 | Kramer et al. ................... | 56/233 |
| 2004/0244207 A1 * | 12/2004 | Menzel et al. ................... | 30/381 |

FOREIGN PATENT DOCUMENTS

| | | |
|---|---|---|
| DE | 7304706 | 11/1973 |
| DE | 20 2004 004 169 U1 | 7/2004 |
| WO | WO 2007/069946 A1 | 6/2007 |

OTHER PUBLICATIONS

Extended European Search Report for European Application No. 11195880.7 dated May 4, 2012 (with partial translation).

* cited by examiner

*Primary Examiner* — Michelle Lopez
*Assistant Examiner* — Chinyere Rushing-Tucker
(74) *Attorney, Agent, or Firm* — Oliff PLC

(57) ABSTRACT

A motor unit has a tool for engaging a work piece with a frame unit, which has a gripping element for the handheld operation of the device, wherein a mechanical coupling is provided between the motor unit and frame unit, which encompasses at least one dampening element, in such a way that makes it possible to precisely guide the tool while improving the dampening of vibrations between the motor unit and frame unit. The frame unit has at least one abutting element, against which the motor unit abuts when a working force exerted by the work piece on the tool has a value below a minimum value.

18 Claims, 1 Drawing Sheet

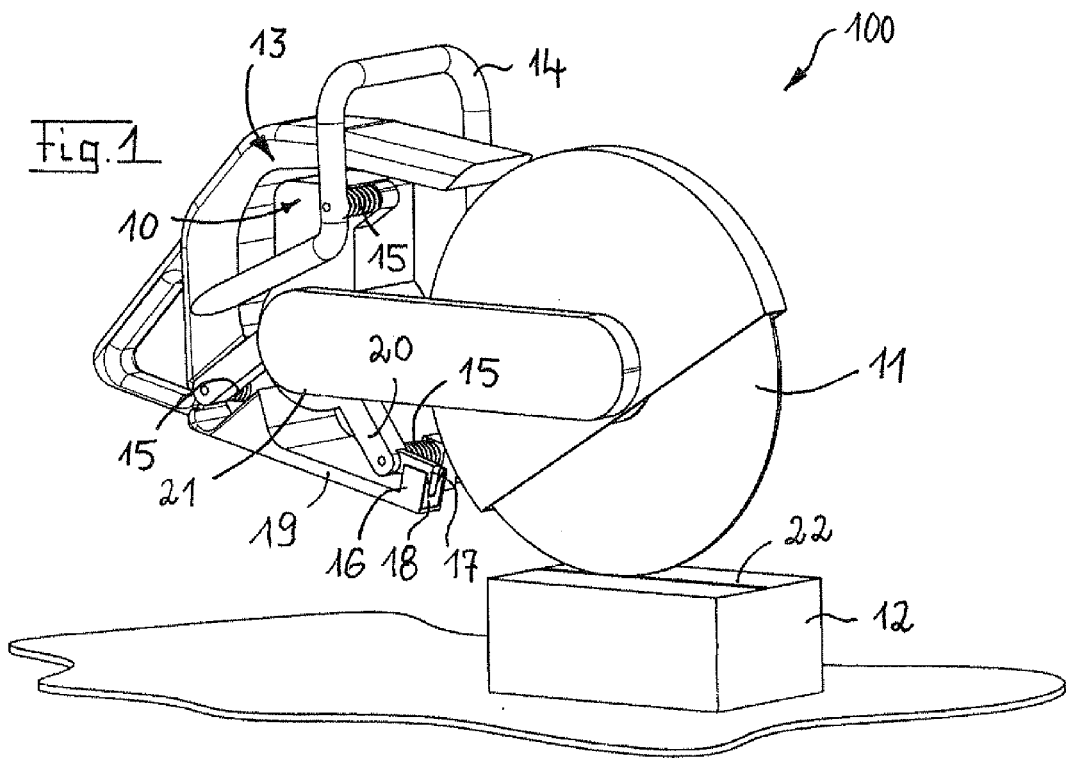
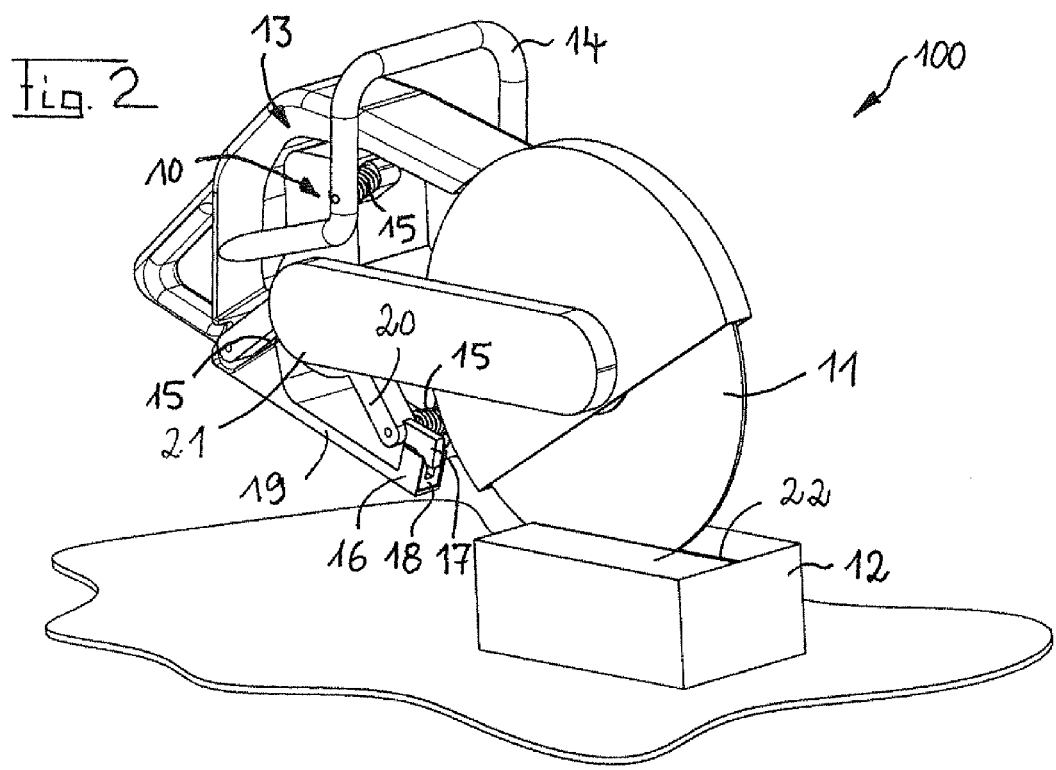

MOTORIZED WORKING TOOL

The present invention relates to a motorized working tool, in particular to a motor-operated abrasive cutting-off device or a motor-operated sawing device, with a motor unit, which exhibits a tool for engaging a work piece, and with a frame unit, which exhibits a gripping element for the handheld operation of the device, wherein a mechanical coupling is provided between the motor unit and frame unit, which encompasses at least one dampening element.

PRIOR ART

DE 7304706U1 shows a motorized working tool based on the example of a portable motorized saw with a motor unit, which exhibits a tool for engaging a work piece, and with a frame unit, which exhibits a gripping element, with which the motorized working tool can be held. Provided between the motor unit and frame unit are dampening elements, so as to dampen the vibrations between the motor unit and frame unit with the gripping element.

Motorized working tools can exhibit one-cylinder reciprocating piston engines, which generate strong vibrations in the motorized working tool. The requirement that a slight vibration load be placed on an operator who guides the motorized working tool with the hands by means of the gripping element can be largely satisfied by providing dampening elements between the motor unit, which stimulates the vibrations, and frame unit with the gripping element. As a consequence, the vibrations in the motor unit are only slightly conveyed to the frame unit with the gripping element, if at all.

In particular if the tool is engaged with the work piece, motor operation is accompanied by further vibration stimulation, and the dampening elements can also minimize the vibration stimulated on the frame unit when the tool engages. For example, acceleration values for the motor unit of $10 \text{ m/s}^2$ or more can be achieved, wherein the dampening elements in the mechanical coupling to the frame unit enable acceleration values in the frame unit of below $5 \text{ m/s}^2$. A very soft configuration of the dampening elements even makes it possible to achieve acceleration values in the frame unit of below $2.5 \text{ m/s}^2$, so that an operator can be exposed to 8 hours of vibrations a day without suffering any physiological damage.

In particular in the case of hand-guided abrasive cutting-off devices or pad sawing devices, with which especially hard materials like steel or stone can be separated, the disadvantage to a softer configuration of the dampening elements is that the motor unit with the tool can no longer be readily guided precisely over the frame with the gripping element. In particular the stimulated vibration allows the motor unit with the tool to develop its own dynamic, and the accurately positioned guiding of the tool against the work piece can no longer be guaranteed, in particular when placing the tool prior to engaging the work piece, and also when cutting at a shallow depth. It is precisely hard materials like steel or granite that make it nearly impossible to place the tool, for example the cutting-off wheel or saw blade, against a marking line, since the frame unit with the tool can jump around when the tool comes into contact with the surface of the work piece. A very flexible mechanical coupling between the frame unit and motor unit no longer makes it possible to sufficiently correct these movements when guided by hand. Only once a cut has been made into the work piece to a minimum depth, achieving the effect of a tool guide, can the tool be prevented from laterally breaking out of the notch.

Therefore, the object of the present invention is to create a working tool that overcomes the disadvantages to the prior art described and enables an improved tool guidance. In particular, the object of the present invention is to further develop a motorized working tool in such a way as to permit a precise guidance of the tool given an improved vibration dampening between the motor unit and frame unit.

This object is achieved proceeding from a working tool according to the preamble to claim 1 using the characterizing features. Suitable further developments of the invention are indicated in the dependent claims.

DISCLOSURE OF THE INVENTION

The invention encompasses the technical instruction that the frame unit exhibits at least one abutting element, against which the motor unit abuts when a working force exerted by the work piece on the tool exhibits a value below a minimum value.

The invention here proceeds from the idea of enabling an improved transmission of a guiding movement from the frame unit into the motor unit by means of the abutting element. If the tool does not engage the work piece or a working force exerted by the work piece on the tool does not yet reach a minimum value, and the tool has to be guided over the work piece, for example to place the tool on a marking on the work piece and achieve a precise first cut in the work piece, the mechanical coupling between the frame unit and motor unit achieved by means of the abutting element brings about the precise guidance of the work piece. The abutting element is designed in such a way as to permit guided movement by the frame unit into the motor unit, thereby enabling a guided movement from the gripping element into the tool. In this operating situation, the abutment of the support element in or on the abutting element establishes a connection between the frame unit and tool unit or motor unit in such a way as to deactivate the interposed spring dampening system, and bring about a direct connection. When the tool engages the work piece, the motor unit detaches from the abutting element as the tool is placed on the work piece or upon reaching the minimum force exerted by the tool on the work piece, and the mechanical coupling between the frame unit and motor unit is again limited to the dampening element(s), so as to enable an optimal vibration dampening.

As an alternative, the motor unit can also exhibit an abutting element against which the frame unit abuts when the tool is not engaged with the work piece or the minimum force has not been reached.

The motor unit can be made to abut against the abutting element under the force of gravity if the value for the working force exhibits a value below the minimum value, in particular if the tool is not engaged with the work piece. The dead weight of the motor unit is initially absorbed by the dampening elements. However, the resilience of the dampening elements causes the motor unit to shift into the frame unit until the motor unit abuts the abutting element of the frame unit. As a result, a portion of the dead weight of the motor unit is still absorbed by the dampening elements, but the resilience selected for the dampening elements can be such that the dead weight of the motor unit causes it to hit the abutting element with a certain contact force.

If the tool is engaged with the work piece, and the user applies the corresponding contact pressure for the tool onto the frame unit, a force from the work piece acts on the tool in a direction that again detaches the motor unit from the abutting element, which happens in particular when the minimum force has been reached. Therefore, the mechanical coupling between the motor unit and frame unit is again limited to the dampening elements when the tool is engaged with the work piece. As a consequence, the full vibration dampening effect can be achieved, wherein in particular the vibrations produced by the tool engaging in the work piece can be effectively dampened, thereby diminishing or eliminating the transmission of vibrations to the frame unit.

For example, the minimum value for the working force exerted by the work piece on the tool at which the frame unit starts to detach from the abutting element measures 10 N to 110 N, preferably 40 N to 80 N, and especially preferred 60 N. For example, at a force of 60 N, the tool can make a first cut into a work piece with a greater hardness, and the first cut already has a depth sufficient to create a guide for the tool, so that the frame unit can detach from the abutting element, and the mechanical coupling between the motor unit and frame unit is again limited to the at least one dampening element.

At least one dampening element can advantageously exhibit a dampening spring, wherein the dampening spring is alternatively or additionally pretensioned to achieve a gravity-induced abutment by the motor unit against the abutting device in such a way that the motor unit comes to abut the abutting element when the value for the working force exhibits a value below the minimum value, in particular when the tool is not engaged with the work piece. The force exerted by the work piece on the tool when the latter is engaged with the work piece is so great that both the dead weight of the motor unit and pretensioning of the dampening spring can be overcome, so that the motor unit detaches from its abutment against the abutting element.

In an advantageous further development of the invention, the motor unit can exhibit at least one support element, which abuts against the abutting element when the value for the working force exhibits a value below the minimum value, in particular when the tool is not engaged with the work piece. In particular, the abutting element can be U or V-shaped in design, and the support element can be configured like a tongue, which engages the U-shaped abutting element in such a way that the tool can be at least vertically and laterally guided by means of the gripping element when the value for the working force exhibits a value below the minimum value, in particular when the tool is not engaged with the work piece, so that the support element engages in the abutting element. If the tool does not engage in the work piece, the tool can be precisely guided by hand via the gripping element, even though the dampening elements are arranged between the motor unit and frame unit. If the tool does engage the work piece, and the support element is detached from its engagement in the abutting element, the tool can center itself relative to the work piece. The process by which the tool centers itself in the work piece can be observed in particular in handheld abrasive cutting-off devices and/or motorized hand saws. Therefore, the tool need not be precisely guided via the gripping element, while maximum vibration dampening is enabled in the frame unit, and thus in the gripping element.

It is further advantageous for the abutting element to exhibit an elastic dampening body, which is located between the abutting element and motor unit, in particular between the abutting element and support element when the latter abuts against the abutting element. If the abutting element exhibits a U-shape, the elastic dampening body can also have a U-shape, and be encompassed or inserted in the U-shape of the abutting element. If the tongue-shaped support element comes to abut against the abutting element, the elastic dampening body is located between the abutting element and support element, enabling a vibration dampening between the motor unit and frame unit even when the value for the working force exhibits a value below the minimum value, in particular when the tool is not engaged with the work piece, and vibrations are stimulated only by the operation of the motor in the motor unit. The U-shape of the abutting element can repeat itself in the dampening body, and a good vertical and lateral guidance of the tool via the gripping element is permitted despite the elastic characteristic of the dampening body. The elastic dampening body can be adhesively bonded in the U-shape of the abutting element, or vulcanized thereupon.

In one possible embodiment of the motorized working tool according to the invention, the mechanical coupling between the motor unit and frame unit can exhibit three dampening elements, wherein preferably at least one abutting element with an allocated support element adjoins at least one dampening element. Furthermore, each dampening element can have allocated to it an abutting element, for example with a U-shape, and in particular a support element, for example shaped like a tongue. In an advantageous further development, the abutting element and in particular the allocated support element can also be a constituent part of the respective dampening element, and the abutting element and in particular the support element is integrated with the dampening element. In like manner, the respective support element can here come to abut the respective abutting element when the value for the working force exhibits a value below the minimum value, in particular when the tool is not engaged with the work piece, and the support element can become detached before coming to abut against the abutting element when the tool is made to engage the work piece, and at least the minimum force for the work piece acts on the tool, so as to move the support element out of its abutment or engagement on or from the abutting element.

It is especially advantageous for the abutting element to exhibit an arrangement between the motor unit and frame unit defined in such a way as to have a minimal distance between the abutting element and tool. As a result, the support element can already be moved out of the abutting element at a low working force exerted by the work piece on the tool. In particular, the movement between the motor unit and frame unit is especially great in an area adjacent to the tool, and the motor unit or support element can be reliably detached from the abutting element when the tool engages in the work piece.

In another possible embodiment, the frame unit can exhibit a floor section, wherein the abutting element is arranged on the floor section or molded thereto. As an alternative, the abutting element can be arranged in form of a mold or single element on any other position in the frame unit, wherein the U or V-shaped alignment of the abutting element is configured in such a way that the support element moves into the abutting element when only the force of gravity acts on the motor unit. The alignment of the abutting element under the force of gravity presumes conventional operation with respect to the working position of the motorized working tool in relation to gravity, for example when the plane of rotation for the tool runs in the vertical. If the objective is to ensure that the motor unit comes to abut against the abutting element with the motorized working tool in another working position as well, for example when the plane of rotation for the tool runs in the horizontal, the abutting element can be designed accordingly, or at least one additional abutting element is provided between the motor unit and frame unit. In particular, the dampening springs can be pretensioned in such a way given an unconventional operating position that the motor unit comes to abut against the abutting element when the tool is not engaged with the work piece.

The motor unit can advantageously exhibit a support arm, which extends toward the floor section of the frame unit, wherein the support element is situated on the end of the support arm. The frame unit can be C-shaped in design, and the motor unit is enveloped by the C-shaped frame unit. The tool can here be located in the opening of the C-shape, so that the abutting element and allocated supporting element are situated at the lower, open end of the C-shape of the frame unit. As a consequence, the abutting element and allocated support element adjoin the tool. A support arm can extend toward the abutting element, and the support element can here be arranged on the end of the support arm.

BRIEF DESCRIPTION OF THE DRAWINGS

In the following, additional measures that improve upon the invention will be described in more detail based on the figures in conjunction with the description of a preferred exemplary embodiment of the invention. The strictly diagrammatic representation shows:

FIG. 1 an exemplary embodiment of a motorized working tool with an abutting element on the frame unit, and with a support element on the motorized unit, wherein the tool is not made to engage the work piece, so that the support element is accommodated in the abutting element, and FIG. 2 the exemplary embodiment of the motorized working tool according to FIG. 1, wherein the tool is made to engage the work piece, so that the support element has been detached from the abutting element.

PREFERRED EMBODIMENT OF THE INVENTION

FIGS. 1 and 2 show an exemplary embodiment of a motorized working tool 100 with the features of the present invention. The motorized working tool 100 is exemplarily depicted as a motor-operated abrasive cutting-off device, and exhibits a motor unit 10, which encompasses a drive motor, for example a reciprocating piston engine, a cutting arm 21 and a tool 11 arranged on the end of the cutting arm 21. The motor, cutting arm 21 and tool 11 here comprise a rigid unit.

The motorized working tool 100 exhibits a frame unit 13, which is C-shaped in design, and incorporates the motor unit 10. In order to manually operate the motorized working tool 100, the frame unit 13 has a gripping element 14, which is rigidly arranged on the frame unit 13.

The mechanical coupling between the motor unit 10 and frame unit 13 exhibits three dampening elements 15, which are shown in the form of dampening springs 15. The dampening springs 15 are arranged in the form of a triangle around the motor of the motor unit 10, and serve to dampen vibrations of the frame unit 13 relative to the motor unit 10.

According to the invention, the frame unit 13 exhibits an abutting element 16, against which the motor unit 10 can come to abut when the value for the working force between the tool 11 and work piece 12 exhibits a value below a minimum value, or when the tool 11 has not yet engaged with the work piece 12.

FIG. 1 shows an exemplary embodiment for the motorized working tool 100, in which the tool 11 is not engaged with the work piece 12, so that the work piece 12 exerts no force on the tool 11. On the motor unit 10, the end of a support arm 20 accommodates a support element 17 that has engaged in the abutting element 16. The flexibility of the dampening springs 15 is here determined in such a way that the dead weight of the motor unit 10 is sufficient to make the support element 17 abut against the abutting element 16.

In the operating situation depicted, in which the support element 17 engages in the abutting element 16, the mechanical coupling between the motor unit 10 and frame unit 13 is expanded by the support element 17 engaging in the abutting element 16. The support element 17 engaging in the abutting element 16 improves the ability to vertically and laterally guide the tool 11, wherein the latter can be placed more effectively on a marking line 22 on the work piece 12, for example, while the tool can be very accurately guided as it introduces a first cut into the work piece. In order to achieve dampened vibrations between the motor unit 10 and frame unit 13 despite the improved vertical and lateral guidance of the tool 11 according to the invention by manipulating the motorized working tool 100 with the gripping element 14, the abutting element 16 incorporates an elastic dampening body 18.

The abutting element 16 is arranged in the floor section 19 of the frame unit 12, and exhibits a U-shape. The support element 17 is tongue-shaped, and can engage into the U-shape of the abutting element 16. The elastic dampening body 18 is here incorporated into the U-shape of the abutting element 16 in such a way that the elastic dampening body 18 comes to lie between the motor unit 10 and frame unit 13, even though the support element 17 engages into the abutting element 16. This makes it possible to at least partially dampen vibrations between the motor unit 10 and frame unit 13.

FIG. 2 shows the motorized working tool 100 with a tool 11, which is engaged with the work piece 12. Engaging with the tool causes the work piece 12 to exert a force on the tool 11, wherein at least a component of the force acting on the tool 11 is directed against the force of gravity exerted by the motor unit 10. This counters the gravity-induced shift of the motor unit 10 in the frame unit 13, and the motor unit 10 is shifted in the frame unit 13 by the force exerted on the tool 11 in such a way that the support element 17 is released from its engagement in the abutting element 16. This limits the mechanical coupling between the motor unit 10 and frame unit 13 back to the three dampening springs 15 again, and permits a complete dampening of vibrations between the motor unit 10 and frame unit 13.

The invention is not limited in its implementation to the preferred exemplary embodiment indicated above. Rather, there are a number of possible variants that make use of the described solution even in embodiments with fundamentally different configurations. All features and/or advantages emanating from the claims, specification or drawings, including structural details, spatial arrangements and procedural steps, can be significant to the invention both taken together or in a wide range of combinations.

In particular, the flexibility of the dampening elements 15 between the motor unit and frame unit 13 can be further increased so as to improve the dampening of vibrations between the motor unit 10 and frame unit 13 even more. The guiding function allowed by the support element 17 engaging in the support element 16 when the tool 11 is not engaged in the work piece 12 makes it possible to guide the tool 11 well even though the dampening elements 15 have a very soft configuration. When the tool 11 is engaged with the work piece 12, the tool 11 guides itself in the work piece 12 to yield a clean work result. In particular, the false positions of the frame unit 13 caused by guiding the motorized working tool 10 by hand cannot be carried over to the tool 11 to any significant extent, thereby further improving the work result.

REFERENCE LIST

100 Motorized working tool
10 Motor unit
11 Tool
12 Work piece

13 Frame unit
14 Gripping element
15 Dampening element, dampening spring
16 Abutting element
17 Support element
18 Dampening body
19 Floor section
20 Support arm
21 Cutting arm
22 Marking line

The invention claimed is:

1. A motorized working tool comprising:
a motor unit;
a tool for engaging a work piece;
a frame unit with gripping element; and
a mechanical coupling provided between the motor unit and the frame unit, which includes at least one dampening element, wherein:
the frame unit includes at least one abutting element, against which the motor unit abuts when a working force exerted between the work piece and the tool is below a minimum value and
the minimum value is a force, at which the motor unit starts to detach from the abutting element, wherein
the motor unit includes at least one support element, which abuts against the abutting element when the working force is below the minimum value.

2. The motorized working tool according to claim 1, wherein the minimum value is within a range of 10 N and 110 N.

3. The motorized working tool according to claim 1, wherein the motor unit comes to abut the abutting element under the force of gravity when the working force is below the minimum value.

4. The motorized working tool according to claim 3, wherein the tool is not engaged with the work piece.

5. The motorized working tool according to claim 1, wherein the at least one dampening element includes at least one dampening spring pretensioned such that the motor unit comes to abut the abutting element when the working force is below the certain minimum value.

6. The motorized working tool according to claim 5, wherein the tool is not engaged with the work piece.

7. The motorized working tool according to claim 1, wherein the abutting element is U or V-shaped in design, and the support element can be configured like a tongue, which engages the U-shaped abutting element such that the tool can be at least vertically and laterally guided by the gripping element when the working force is below the minimum value.

8. The motorized working tool according to claim 7, wherein the tool is not engaged with the work piece.

9. The motorized working tool according to claim 1, wherein the abutting element includes an elastic dampening body, which is located between the abutting element and the motor unit when the motor unit abuts against the abutting element.

10. The motorized working tool according to claim 1, wherein the mechanical coupling between the motor unit and the frame unit includes three dampening elements.

11. The motorized working tool according to claim 1, wherein the abutting element includes an arrangement between the motor unit and the frame unit defined in such a way as to have a distance between the abutting element and the tool, and the distance is determined such that the support element is moved out of the abutting element when the working force is the minimum value.

12. The motorized working tool according to claim 1, wherein
the frame unit includes a floor section, and
the abutting element is arranged on the floor section or molded thereto.

13. The motorized working tool according to claim 1, wherein the motor unit includes a support arm that extends toward a floor section, and the support element is arranged on the end of the support arm.

14. The motorized working tool according to claim 1, wherein the motorized working tool is a motor operated abrasive cutting device or a motor operated sawing device.

15. The motorized working tool according to claim 1, wherein the minimum value is within a range of 40 N and 80 N.

16. The motorized working tool according to claim 1, wherein the minimum value is 60 N.

17. The motorized working tool according to claim 1, wherein the abutting element includes an elastic dampening body, which is located between the abutting element and the support element when the support element abuts against the abutting element.

18. The motorized working tool according to claim 1, wherein
the mechanical coupling between the motor unit and the frame unit includes three dampening elements, and
at least one abutting element with an allocated support element adjoins at least one dampening element.

* * * * *